United States Patent [19]
Henriksen

[11] 3,734,425
[45] May 22, 1973

[54] MECHANICAL FILM SENSOR
[75] Inventor: Elmer C. Henriksen, Chicago, Ill.
[73] Assignee: Bell & Howell Company, Chicago, Ill.
[22] Filed: Nov. 16, 1971
[21] Appl. No.: 199,224

[52] U.S. Cl. .................... 242/187, 242/197, 352/72
[51] Int. Cl. ..... B65h 59/38, G03b 1/04, G11b 15/32
[58] Field of Search ............. 242/187–190, 197–200; 274/4 B, 4 C, 11 B, 11 C; 352/72

[56] References Cited
UNITED STATES PATENTS
3,606,199   9/1971   Fujimoto ............................ 242/187

Primary Examiner—Leonard D. Christian
Attorneys—Kenneth W. Greb, John E. Peele and William K. Serp

[57] ABSTRACT

A film handling apparatus for a movie projector includes a cartridge supporting a reel of film and a mechanical film sensor. The sensor includes a film follower member integral with a reel blocking member for engaging and blocking rotation of a reel when the film follower senses a predetermined amount of film on the reel hub thereby providing film tension for actuating an automatic rewind mechanism in the projector.

4 Claims, 4 Drawing Figures

Patented May 22, 1973 3,734,425
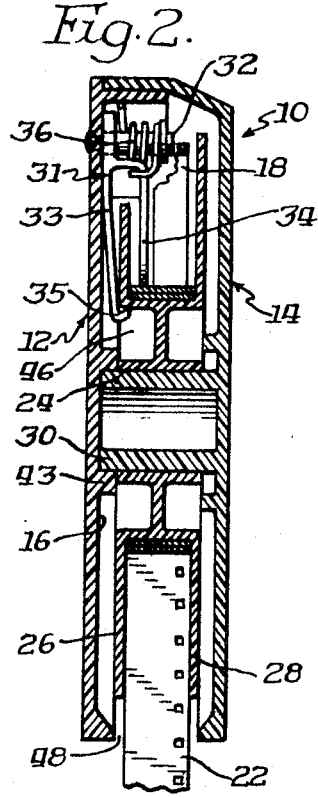
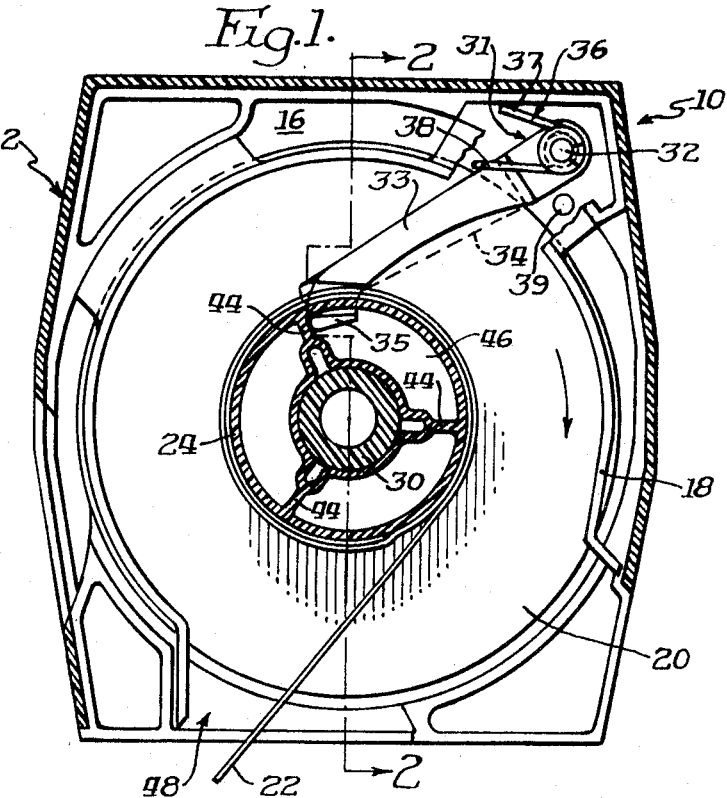
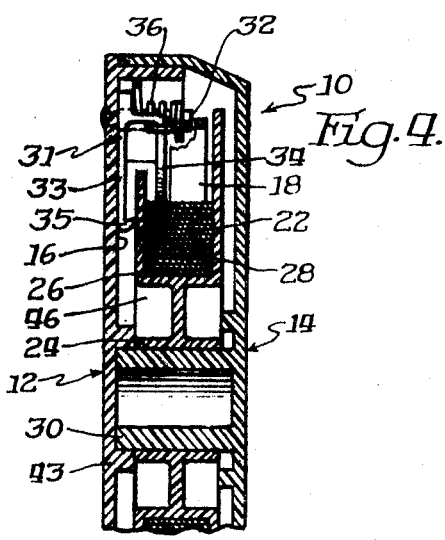
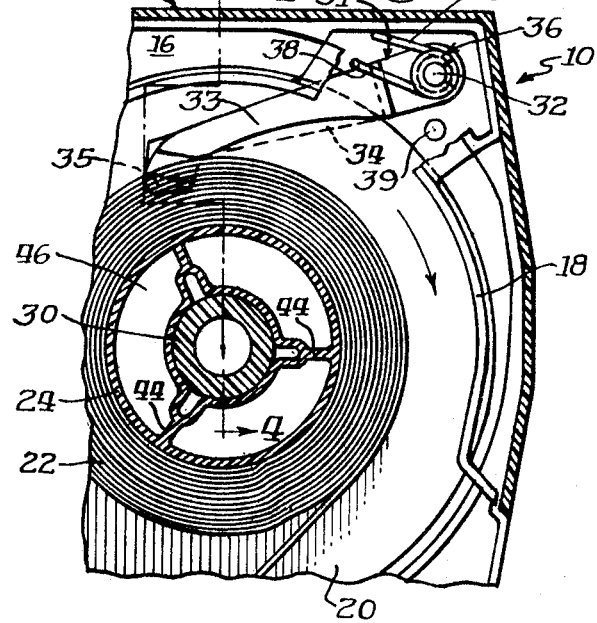

MECHANICAL FILM SENSOR

FIELD OF THE INVENTION

This invention relates to a mechanical film sensor for film reels on which the end of the film wound on the reel is not anchored to the reel, and is particularly concerned with means for automatically stopping the unwinding rotation of the reel before the film is completely unwound from the reel to facilitate rewinding the film on the reel.

BACKGROUND OF THE INVENTION

Heretofore it has been necessary to anchor one end of a film to the reel on which it is wound, to insure retention of the film on the reel as the rotation of the reel is reversed by rewind mechanism actuated by film tension.

SUMMARY OF THE INVENTION

In accordance with the present invention, a spring biased bifurcated lever having its base pivotally secured to one wall of a film cartridge has a shorter arm riding on the outer surface of the film wound on the reel housed in the cartridge and a longer arm between the wall of the cartridge and the adjacent flange of the reel. The spring urges the free end of the lever pivotally toward the hub of the reel as the diameter of the coil of film is decreased by unwinding the film. The free end of the longer arm has an inwardly extending finger that engages a radial web of the spider within the hub to stop the unwinding rotation of the reel before the film is completely unwound from the reel. Stopping the rotation of the reel tensions the film between the hub of the reel and the drive means pulling the film from the reel. The tension on the film actuates an automatic rewind mechanism that is not part of the present invention.

Suitable structure by means of which the above noted and other advantages of the invention are attained will be fully described in the following specification, taken in conjunction with the accompanying drawings.

BRIEF DESCRIPTION OF THE DRAWINGS

FIG. 1 is a sectional view of a film cartridge with the film sensor in the reel blocking condition.

FIG. 2 is a cross sectional view of the film cartridge, taken along line 2—2 of FIG. 1.

FIG. 3 is a fragmentary sectional view, similar to FIG. 1, with the film sensor in an ineffective condition.

FIG. 4 is a cross sectional view of the film cartridge, taken along line 4—4 of FIG. 3.

DESCRIPTION OF THE ILLUSTRATED EMBODIMENT

The present invention is supported in a film cartridge 10. Only a brief description of the cartridge 10 will follow. If more details of the cartridge 10 are desirable, a complete description can be found in a patent application to Bradt, et al., Ser. No. 826,045, filed Apr. 21, 1969, which has the same assignee.

Referring to the drawings, the film cartridge 10 comprises a base section 12 and a top section 14. The base section 12 has a substantially flat back portion 16. A film guide 18 forming a major portion of a circle is supported on and spaced from the back portion 16. A reel 20 supporting a roll of film 22 on the reel hub 24 is assembled on the base section 12 by locating the film guide 18 between the reel flanges 26 and 28. The top section 14 assembles with the base section 12 to substantially enclose the reel 20 therein. A reel bearing projection 30 is formed from the top section 14 for pivotally supporting the reel 20 centrally within the cartridge 10.

A bifurcated lever 31 formed from a plastic material has its base end pivotally mounted on a pin 32 projecting inwardly from the back portion 16 adjacent the periphery of the reel 20. The bifurcated end of the lever 31 has a pair of parallel arms 33 and 34 extending between the back portion 16 and the film guide 18 in planes substantially parallel to the back portion 16. The arm 33 functions as a reel blocking member and the arm 34 functions as a film follower member. The arm 33 is longer than the arm 34 and has a finger 35 at its free end. The finger 35 extends at an angle from the free end of the arm 33 toward the arm 34. A spring 36 coiled around the pin 32 has one end 37 biased against the cartridge 10 and its other end 38 biased against one edge of the lever 31 to urge its free end toward the reel hub 24. A pin 39 projecting inwardly from the back portion 16 is located to stop the pivotal movement of the lever 31 before the finger 35 reaches the center of the cartridge 10 in the absence of a reel of film. The lever 31 is thus located to receive a reel of film for efficiently positioning the lever 31 in a film following condition. The arm 34 is spaced from the back portion 16 to enter between the flanges 26 and 28 of the reel 20 and contact the outer convolution of the film 22 when the reel 20 is inserted into the cartridge 10. The flange 26 of the reel 20 flexes the finger 35 toward the back portion 16 when the reel 20 is inserted into the cartridge 10. The finger 35 is biased against the flange 26 by the resiliency of the plastic material. The illustrated reel 20 is one of the standard reels having solid flanges. A second type of the standard reel is having a plurality of openings in the flanges. The present invention will also operate with the second type reel.

The cartridge 10 has a centrally disposed circular boss 43 extending inwardly from the back portion 16 for spacing the reel 20 from the inner surface of the back portion 16. The boss 43 has an inside diameter greater than the outside diameter of the reel bearing projection 30 to permit the projection 30 to extend into the boss 43 when the top section 14 is assembled to the base section 12. The hub 24 of the reel 20 has radial webs 44 functioning as an abutment spaced around the hub 24 with recesses 46 between the webs 44.

The cartridge 10 has an opening 48 permitting film to be pulled from the reel 20 and to be rewound on the reel 20. As the film is pulled from the reel 20 (clockwise in FIGS. 1 and 3), the outside diameter of the roll of film 22 gradually decreases and the free end of the arm 34 moves pivotally toward the hub 24. The arm 34 acts as a sensor and the position of its free end relative to the hub 24 indicates the length of the film remaining on the reel 20. The arm 33 moves with the arm 34 as the film is unwound from the reel 20. Being the finger 35 of the arm 33 is biased against the flange 26, the finger 35 enters a recess 46 and engages a web 44 for blocking rotation of the reel 20 while the free end of the arm 34 senses a minimum of two convolutions of film 22 on the hub 24. Having film remain on the hub 24 in this manner, the reel 20 may be rotated in the rewind direction for conveniently rewinding the film 22 on the hub 24 without mechanically attaching the end of the film to the hub by the conventional film anchoring means.

The mechanical film sensor having blocked the rotation of the reel 20, a tension in the film 22 is created between the projector and the cartridge 10. The tension on the film 22 actuates a rewind mechanism (not shown) for rewinding the film onto the reel 20. During rewinding, the film 22 pivots the arm 34 away from the hub 24 and the webs 44 cam the finger 35 out of the recess 46 by rotation in a counterclockwise direction. The finger 35 again rides against the flange 26 which places the film sensor in the film following condition as shown in FIG. 3.

What is claimed is:

1. A film handling apparatus comprising:
   a reel having
      a flange, and
      a hub for supporting a roll of film, said hub including
      a recess and an abutment; and
   sensor means including
      a follower member for riding against the outer convolution of the film, and
      a blocking member integrally formed with said follower member and riding against said flanges until entering
   said recess and engaging said abutment
   whereby said blocking member blocks rotation of the reel when said follower member senses a predetermined amount of film on said hub.

2. A film handling apparatus as defined in claim 1 wherein said blocking member has a blocking finger formed toward said follower member for internally biasing said finger against said flange and into said recess for engaging said abutment.

3. A film handling apparatus as defined in claim 1 wherein said sensor means further includes a spring biasing said follower member and said blocking member toward said hub.

4. A film cassette comprising:
   a reel supporting a roll of film rotatably mounted in the cassette;
   said reel includes a hub and a flange, a recess and an abutment formed from said hub; and
   film sensor means supported in the cassette including a follower member positioned for engaging the outer convolution of the roll of film, a blocking member integrally formed from said follower member and positioned for riding against said flange, a spring biasing said follower member against the outer convolution of the film causing said follower member and said blocking member to move radially inwardly toward said hub as the film supply decreases and said blocking member being flexibly biased to enter said recess and engage said abutment for blocking rotation of said reel when a predetermined number of film convolutions remain on said hub.

* * * * *